United States Patent [19]

Takahashi et al.

[11] Patent Number: 5,048,145
[45] Date of Patent: Sep. 17, 1991

[54] WIPER BLADE WITH IMPROVED LEVER TO YOKE CONNECTOR

[75] Inventors: Tuyoshi Takahashi; Yukinori Uchida, both of Yokohama, Japan

[73] Assignee: Jidosha Denki Kogyo K.K., Kanagawa, Japan

[21] Appl. No.: 614,523

[22] Filed: Nov. 16, 1990

Related U.S. Application Data

[63] Continuation of Ser. No. 380,358, Jul. 17, 1989, abandoned.

[30] Foreign Application Priority Data

Jul. 19, 1988 [JP] Japan .............................. 63-95297[U]

[51] Int. Cl.$^5$ .............................. B60S 1/04; B60S 1/38
[52] U.S. Cl. .................................. 15/250.42; 15/250.31
[58] Field of Search ........... 15/250.42, 250.35, 250.36, 15/250.31, 250.32, 250.33

[56] References Cited

U.S. PATENT DOCUMENTS

| | | | |
|---|---|---|---|
| 3,576,044 | 4/1971 | Besnard | 15/250.32 |
| 4,177,537 | 12/1969 | Roadarmel | 15/250.32 |
| 4,337,547 | 7/1982 | Hancou | 15/250.32 |
| 4,360,942 | 11/1982 | Dal Palü15 | 250.42/ |
| 4,391,015 | 7/1983 | van den Berg | 15/250.42 |
| 4,598,438 | 7/1986 | Egner-Walter et al. | 15/250.32 |
| 4,794,664 | 1/1989 | Arai | 15/250.42 |

FOREIGN PATENT DOCUMENTS

| | | | |
|---|---|---|---|
| 290324 | 11/1988 | European Pat. Off. | 15/250.32 |
| 1430279 | 12/1970 | Fed. Rep. of Germany | 15/250.32 |
| 2819540 | 9/1978 | Fed. Rep. of Germany | 15/250.32 |
| 3021316 | 12/1981 | Fed. Rep. of Germany | 15/250.32 |
| 2448460 | 10/1980 | France | 15/250.42 |
| 2482914 | 11/1981 | France | 15/250.32 |
| 1506385 | 5/1978 | United Kingdom | 15/250.32 |
| 2067068 | 7/1981 | United Kingdom | 15/250.32 |
| 2159043 | 11/1985 | United Kingdom | 15/250.42 |

Primary Examiner—Harvey C. Hornsby
Assistant Examiner—Gary K. Graham
Attorney, Agent, or Firm—Sughrue, Mion, Zinn, Macpeak & Seas

[57] ABSTRACT

A wiper blade is provided with an improved lever to yoke connection. The lever has a yoke-fitting part at each end defining a hooking hole with an opening which opens towards the opposite hooking hole. The yoke-fitting part includes an engaging part and a projection which defines the opening. The yoke has a lever-fitting part including a lever-setting shaft for engagement with the hooking hole. To prevent the yoke from dropping off the lever, a protrusion is provided on the lever. The particular wiper blade allows easy assembly and improved strength of the yoke.

1 Claim, 5 Drawing Sheets

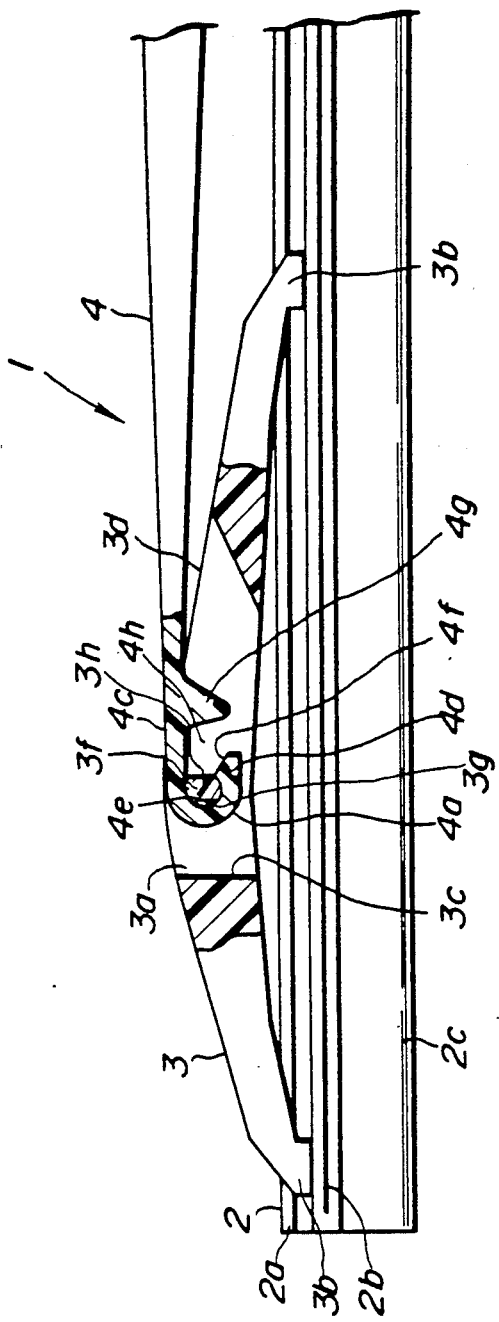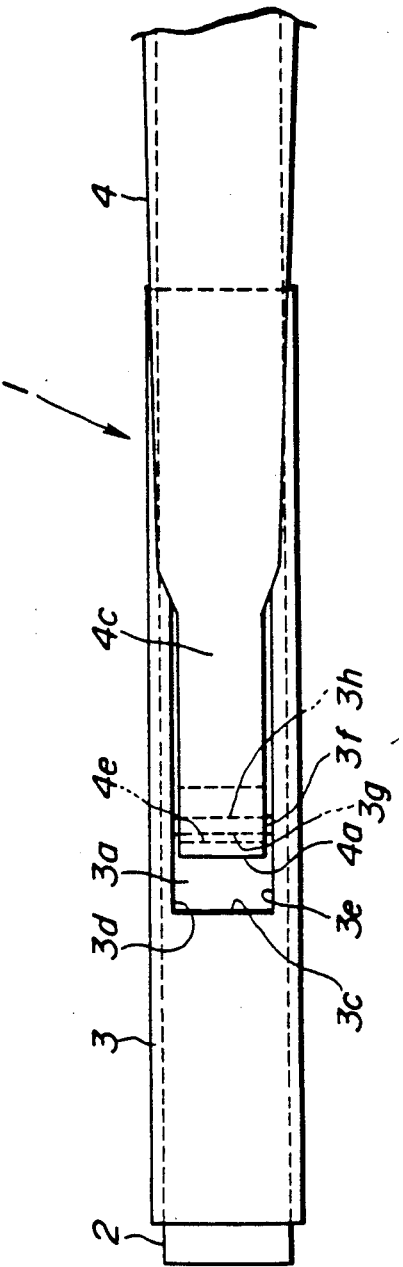

WIPER BLADE WITH IMPROVED LEVER TO YOKE CONNECTOR

This is a continuation of application Ser. No. 07/380,358 filed July 17, 1989 now abandoned.

BACKGROUND OF THE INVENTION

1. Field of the Invention

This invention relates to a wiper blade used for wiping a windshield or other window of, for example, an automobile.

2. Description of the Prior Art

Heretofore, there has been such a wiper blade as shown in FIGS. 6 to 8.

Namely, a wiper blade 100 shown in figures has a blade rubber 101 in contact with a wiper surface such as a windshield, a yoke 103 attached with said blade rubber 101 and provided with a lever-fitting part 103a for fitting to a lever 102, and the synthetic-resinous lever 102 provided with a yoke-fitting part 102a for fitting to the lever-fitting part 103a and provided with a wiper arm-connecting part 102b for connecting to a wiper arm 104.

Hereupon, as shown in FIG. 8, there is an oblong opening 103b at the lever-fitting part 103a of the yoke 103 pierced through from side to side in FIG. 7, and there are projections 103c and 103c in said opening 103b protruding and facing each other in the inward direction.

And the lever 102 has recesses 102c and 102c corresponding to respective projections 103c and 103c of said lever-fitting part 103a.

Said projections 103c and 103c provided to the lever-fitting part 103a are fitted into said recesses 102c and 102c provided to the yoke-fitting part 102a by forcing the yoke-fitting part 102a equipped to the lever 102 into the lever-fitting part 103a equipped to the yoke 103 attached with the blade rubber 101 (in this case, said wiper blade 100 has two yokes at positions shifted to both ends of said blade rubber 101) from the left side in FIG. 7, hereby said yoke 103 is so structured as to engage with the lever 102 rotatably.

However, in the conventional wiper blade 100 as described above, of which the lever 102 is fitted to the yoke 103 by forcing recesses 102c and 102c of the yoke-fitting part 102a onto projections 103c and 103c of the lever-fitting part 103a, it is complicated to assemble because it is necessary to force the lever-fitting part 103a equipped to the yoke 103 open in opposite directions in FIG. 8 when the lever 2 is forced in. There is a problem in that it is difficult to simplify the assembling of the parts.

Furthermore, said lever-fitting part 103a equipped to the yoke 103 has the oblong opening 103b pierced through from side in FIG. 7, and said opening 103b has projections 103c and 103c protruding and facing each other in the inward direction, therefore the strength at the lever-fitting part 103a decreases, there is another problem in that the lever 102 may come off the yoke 103 after the fitting of the yoke-fitting part 102a. Accordingly, it is desirable to develop a wiper blade which is very easy to assemble and is excellent in the strength of the yoke, and which is so structured as not to allow the disconnection of the yoke and lever so easily.

SUMMARY OF THE INVENTION

The present invention is made in view of the above mentioned problems of the prior art as a result of particular considerations of the structure, it is an object to provide a wiper blade which is very easy to assemble and is excellent in the strength of the yoke, and of which the yoke and the lever are not disconnected so easily.

The construction of the wiper blade according to this invention for attaining the above-mentioned object is characterized by having a blade rubber in contact with a wiped surface, a yoke attached with said blade rubber and provided with a lever-fitting part, and a lever provided with a yoke-fitting part for fitting to the lever-fitting part of said yoke and connected to a wiper arm, said lever-fitting part being equipped with a lever-setting shaft bridging said lever-fitting part, said yoke-fitting part being equipped with an engaging part having a projection for retaining said lever-setting shaft in a hooking hole, said lever being provided with a downward extending protrusion to restrict disengagement of said shaft from said yoke fitting part.

Therefore, it is easy to assemble the parts, the strength of the lever-fitting part is high, and the wiper blade is so structured that the lever does not easily come off the yoke.

BRIEF DESCRIPTION OF THE DRAWINGS

FIG. 4 is a partially sectional plan view of the neighborhood of the yoke of the wiper blade according to another embodiment of this invention;

FIG. 5 is a plan view of the wiper blade shown in FIG. 4;

DESCRIPTION OF THE PREFERRED EMBODIMENTS

Figure 1:
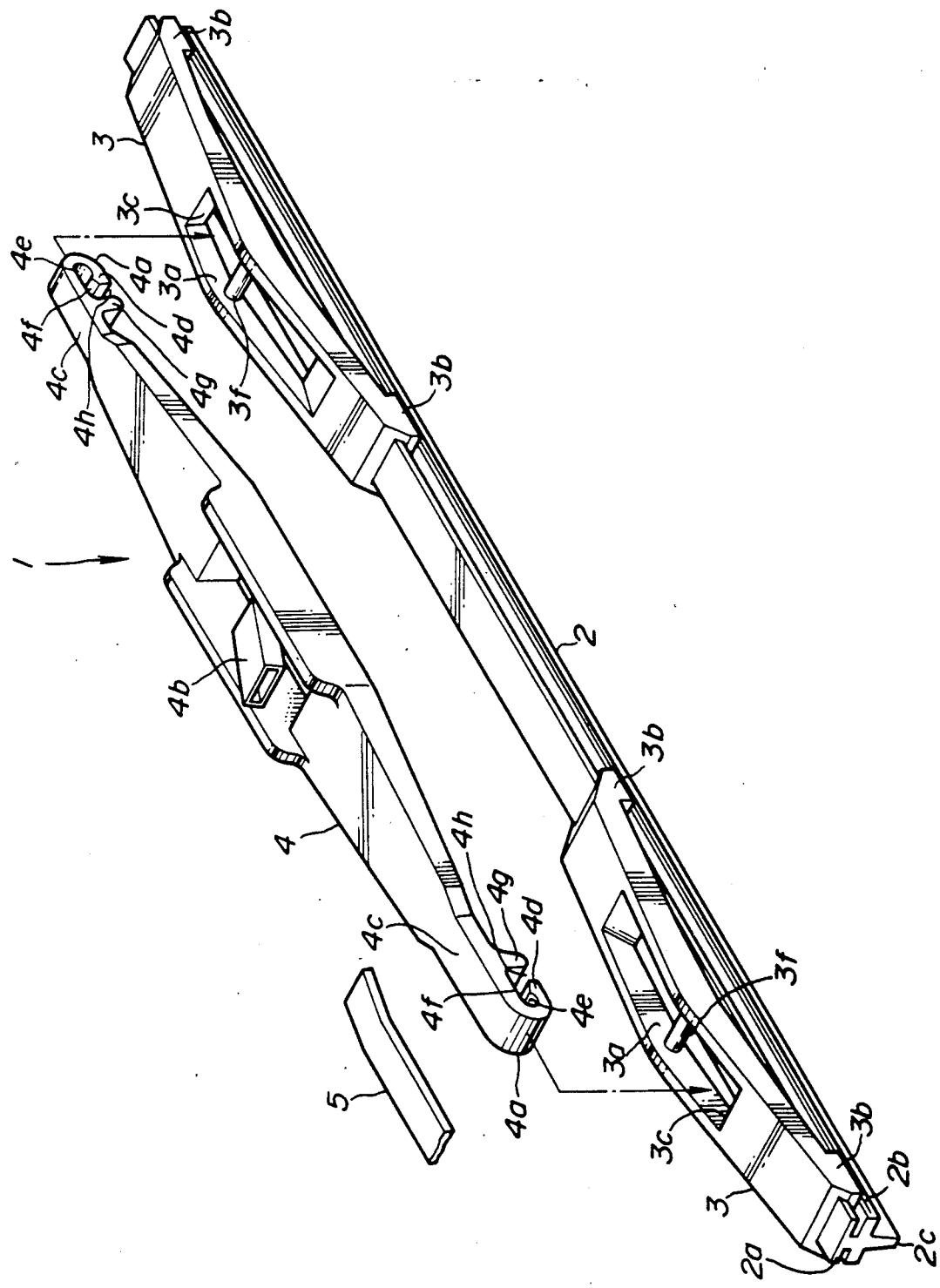
FIG. 1 is a perspective outside view of respective members illustrating the assembling relations of the yoke and the lever of the wiper blade according to an embodiment of this invention.

An embodiment of the wiper blade according to this invention will be described below on basis of FIGS. 1 to 3.

In a wiper blade 1 shown in the Figures, numeral 2 is a blade rubber in contact with a wiped surface (not shown), numeral 3 is a yoke attached with said blade rubber 2 and provided with a lever-fitting part 3a, and numeral 4 is a lever provided with a yoke-fitting part 4a for fitting to the lever-fitting part 3a of said yoke 3 and connected to a wiper arm 5.

Said blade rubber 2 which is made of rubber and has a nearly T-shaped cross section, which is provided with a base part 2a for attaching the yoke on the upper side in FIG. 1 along the longitudinal direction thereof, and a vertebra 2b energizing the said blade rubber 2 into straight line on the lower side of base part 2a in FIG. 1, furthermore which is provided with a contact part 2c in contact with the wiped surface (not shown) in the lower end side in FIG. 1.

On the one hand, said yoke 3 is made of synthetic resin of hard type as a material, in this embodiment two yokes 3 are attached to said blade rubber 2, however in another application three or four yokes 3 can be used according to the full length of the blade rubber 2.

Figure 2:
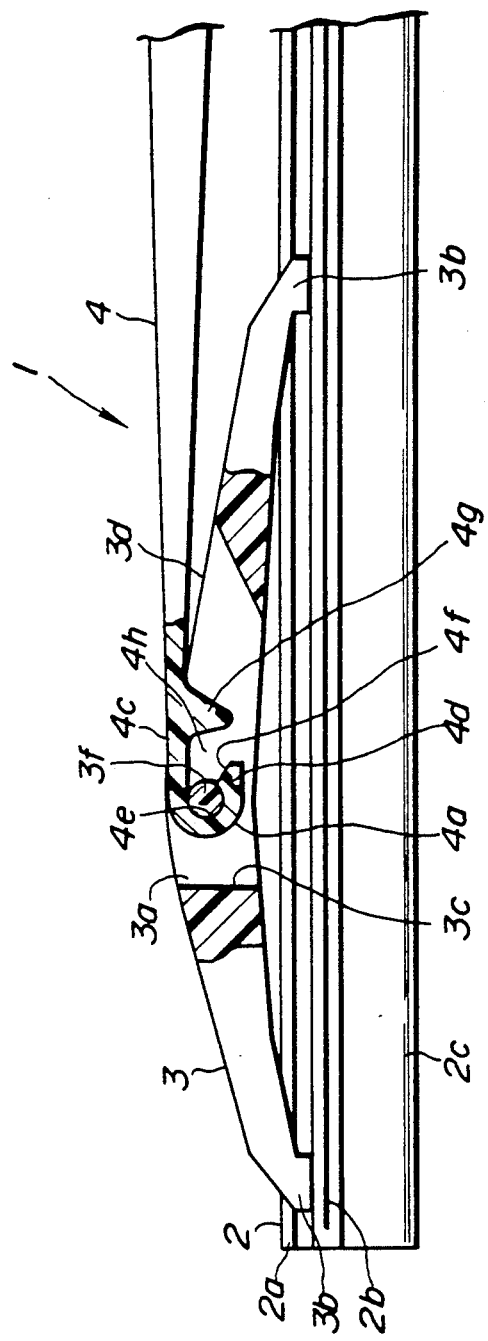
FIG. 2 is a partially sectional side view of the neighborhood of the yoke in the assembled state of the wiper blade shown in FIG. 1.

Said yoke 3 as shown in FIG. 2, is provided with a holding part 3b holding the base part 2a of said blade rubber 2 at both ends in the Figure respectively, and is provided with the lever-fitting part 3a for fitting to the lever 4 at the nearly middle position in the Figure.

Figure 3:
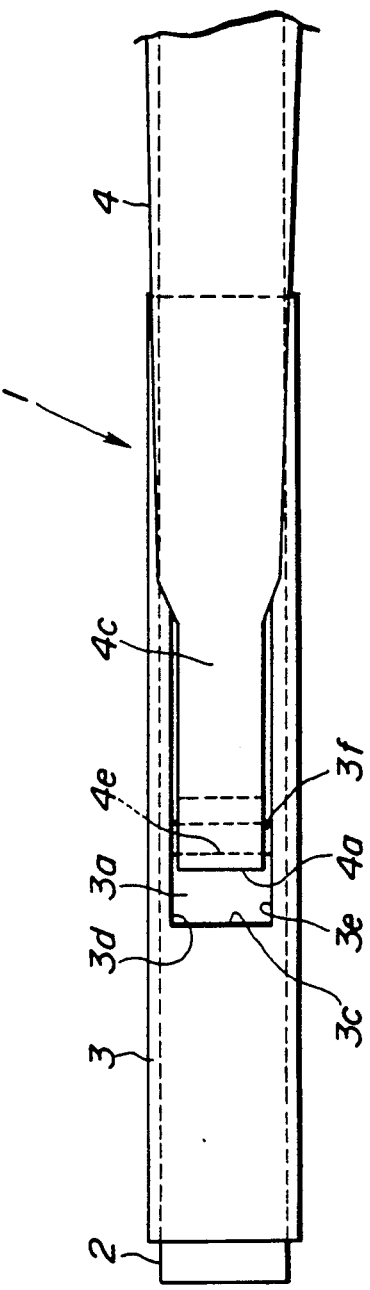
FIG. 3 is a plan view of the wiper blade shown in FIG. 2.
Figure 6:
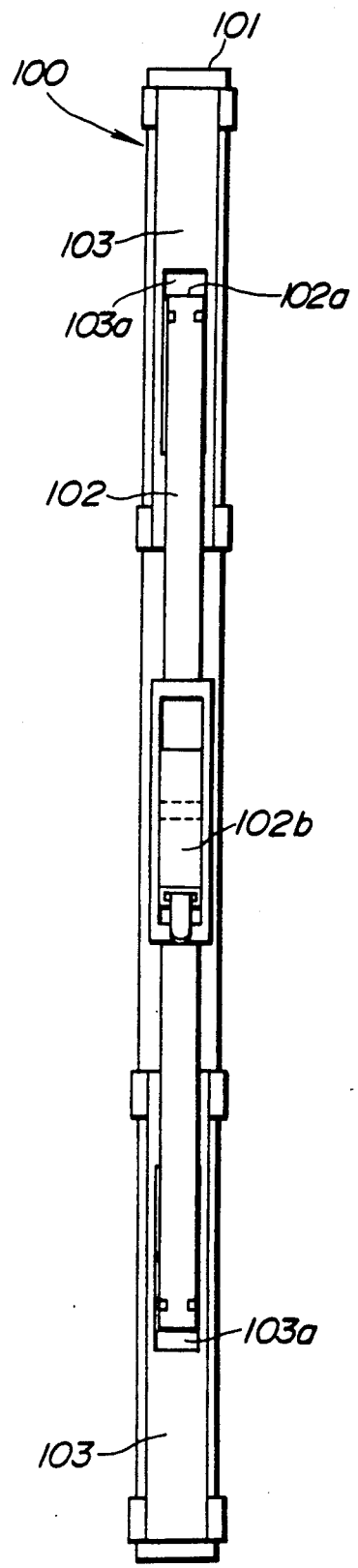
FIGS. 6 and 7 are plan views of a conventional wiper blade, respectively.
Figure 7:
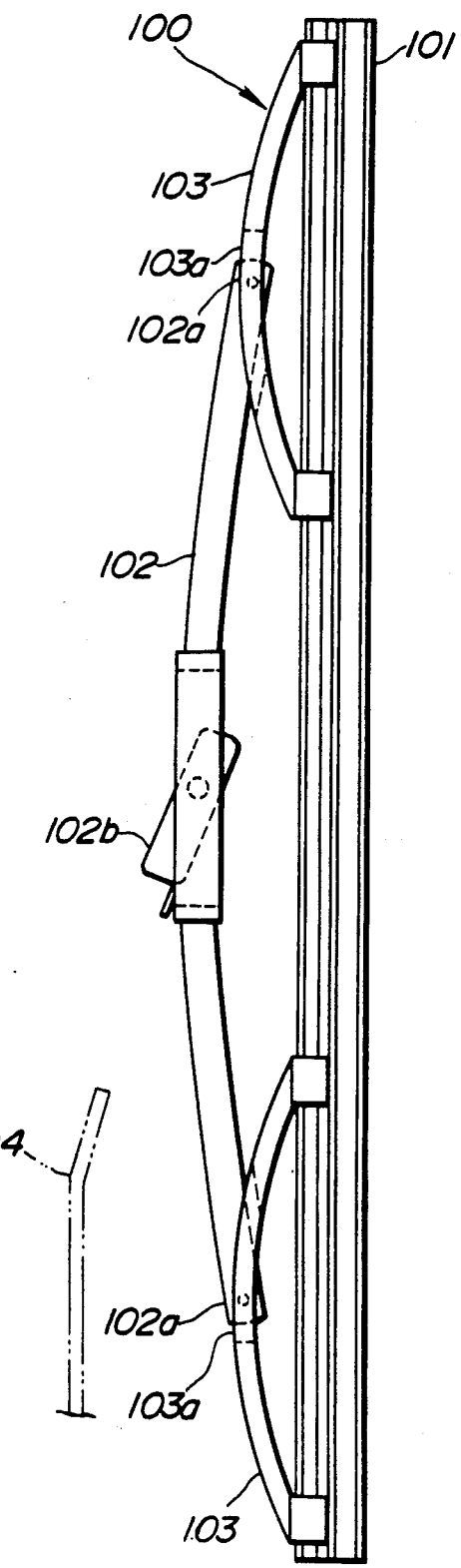
Figure 8:
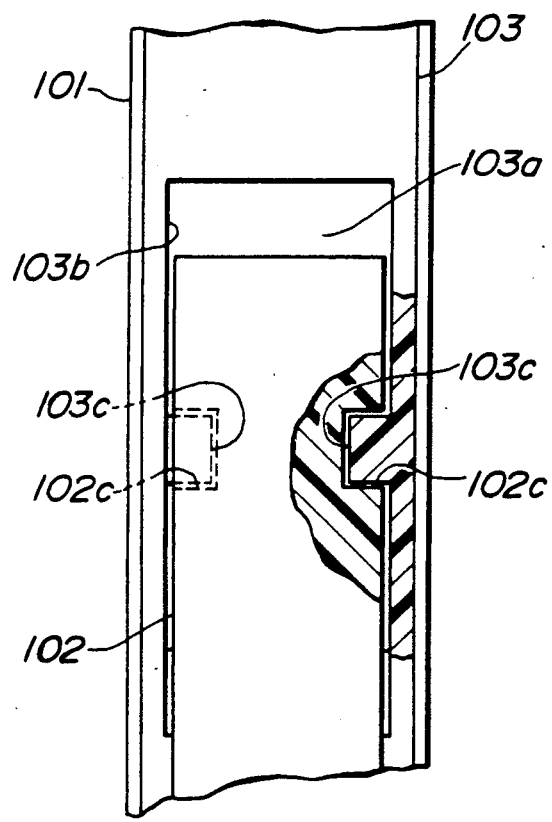
FIG. 8 is a partially sectional plan view of the neighborhood of the yoke illustrating the assembling relations of the yoke and the lever of the conventional wiper blade.

And said lever-fitting part 3a is provided with an oblong opening 3c cut off through the yoke 3 vertically in FIG. 1, and is equipped with a cylindrical lever-setting shaft 3f bridging side walls 3d and 3e existing at the upper and lower sides in FIG. 3 in the vertical direction in FIG. 3.

On the other hand, said lever 4 is made of synthetic resin of hard type in the same manner as said yoke 3, is provided with a connecting part 4b for connecting to an end of the wiper arm 5 at the nearly middle position thereof, and is provided with the yoke-fitting part 4a for fitting to the yoke 3 at both ends thereof respectively.

And, said yoke-fitting part 4a is equipped with a projection 4d protruding upwardly in FIG. 2 of the inside of the end extending into U-like shape from an end wall 4c existing at the position shifted to the end of said lever 4 to the lower side in FIG. 2, and is equipped with a hooking hole 4e having an inner diameter slightly larger than an outer diameter of the lever-setting shaft 3f provided to the lever-fitting part 3a, an engaging part 4f comprising said projection 4d and said hooking hole 4e is so designed as to engage rotatably with the yoke 3 by setting said lever-setting shaft 3f.

Furthermore, said yoke-fitting part 4a has a protrusion 4g extending downward in FIG. 2 from said end wall 4c, and so there is a gap 4h slightly larger than the outer diameter of the lever-setting shaft 3f between said protrusion 4g and the end of said engaging part 4f. Said projection 4d of the engaging part 4f serves to hold the lever-setting shaft 3f so as not to come off.

Hereupon, at the state in which the yoke 3 is attached to the blade rubber 2 by holding the base part 2a of said blade rubber 2 with respective holding part 3b, said engaging part 4f is fitted onto the lever-setting shaft 3f by putting the gap 4h of the yoke-fitting part 4a over the lever-setting shaft 3f of the lever-fitting part 3a.

In this way, respective yoke 3 is engaged to the lever 4 rotatably.

In this embodiment, fitting structure of said wiper blade 1 is suitable for a large-sized wiper blade comparatively, because the area of the sliding-contact surface between the lever-setting shaft 3f of the lever-fitting part 3a and the engaging part 4f having the projection 4d of the yoke-fitting part 4a is large.

The wiper blade according to another embodiment of this invention is shown in FIGS. 4 and 5.

In the case of this embodiment, the lever-fitting part 3a is equipped with the lever-setting shaft 3f having flat notched surfaces 3g and 3h opposed at left and right sides in FIG. 4, and the part of the wiper blade excepting above-mentioned part is much the same as before-mentioned embodiment.

In this case, the yoke 3 is so designed as to engage with the lever 4 rotatably by pushing down the lever 4 in the clockwise direction in FIG. 4 after fitting the yoke-fitting part 4a to the lever-fitting part 3a in the standing position of the lever 4 in FIG. 4.

Therefore, fitting structure of this embodiment is suitable for a small-sized blade comparatively, because area of the sliding-contact surface between the lever-setting shaft 3f of the lever-fitting part 3a and the engaging part 4f having the projection 4d of the yoke-fitting part 4a is small.

As mentioned above, the wiper blade according to this invention has a blade rubber in contact with a wiper surface, a yoke attached with said blade rubber and provided with a lever-fitting part, and a lever provided with a yoke-fitting part for fitting to the lever-fitting part of said yoke and connected to a wiper arm, said lever-fitting part is equipped with lever-setting shaft bridging said lever-fitting part, and said yoke-fitting part is equipped with an engaging part having a projection for engaging with said lever-setting shaft rotatably. Therefore an excellent effect is obtained that it is possible to assemble easily comparing with the conventional wiper blade, the strength of the yoke is high and the yoke does not come off the lever easily.

What is claimed is:

1. A wiper blade comprising:
   a blade rubber adapted to be disposed in contact with a curved surface to be wiped;
   a pair of yokes attached to said blade rubber with each yoke provided with a lever-fitting part; and
   a lever provided with a pair of U-shaped yoke-fitting parts at opposite ends of the lever for engaging said lever-fitting parts of said yokes respectively and having connecting means for connecting said lever to a wiper arm;
   each of said U-shaped parts defining a hooking hole with an opening which opens towards the opposite hooking hole;
   each of said lever-fitting parts being equipped with a lever-setting shaft bridging said lever-fitting part;
   said U-shaped yoke-fitting parts each having an engaging part extending toward each other with each engaging part having a projection defining said opening to said hooking hole in which one of said lever-setting shafts is rotatably engaged; and
   said lever being provided adjacent each yoke-fitting part with a protrusion extending downward and spaced from an end of said engaging part adjacent thereto for restricting the disengagement of said lever-setting shaft from the engaging part of said U-shaped yoke-fitting part.

* * * * *